Patented Mar. 7, 1939

2,149,484

UNITED STATES PATENT OFFICE 2,149,484

CYCLIC HALOGEN CONTAINING RUBBER DERIVATIVES

Herbert A. Winkelmann and Eugene W. Moffett, Chicago, Ill., assignors to Marbon Corporation, a corporation of Delaware No Drawing. Application October 31, 1936, Serial No. 108,682

2 Claims. (Cl. 260—111)

This invention relates to a rubber derivative and to a method for making same. More particularly it relates to a low chlorine containing, hard, brittle, resinous reaction product of rubber and hydrogen chloride.

It is known that hydrogen chloride will add to the double bonds of a rubber molecule, that the completely reacted product of natural rubber and hydrogen chloride will contain approximately 31% chlorine, and be a non-tacky, moderately hard, tough plastic. As the chlorine content goes below 25% the tackiness of the product becomes pronounced, and the resemblance in other ways to unvulcanized rubber increases. It is also known that by treating rubber with chlorostannic acid or with compounds of amphoteric metals, such as tin tetrachloride or iron chloride, in the presence of hydrochloric acid that a condensation derivative is obtained which contains small amounts of chlorine and is apparently a hydrogen chloride addition product of the derivative obtained when solely the amphoteric metal compound is used. The characteristics of this material will vary greatly depending on the time and temperature of reaction. Likewise, the proportion of bound chlorine will vary in amount, depending on the temperature and the concentration of chlorostannic acid used, but will in general run below 2%. Furthermore, the product will contain stannic chloride which is extremely difficult to remove.

We have discovered a method of making a reaction product of rubber and hydrogen chloride which is different from either the rubber hydrochlorides or the halostannic acid-rubber reaction products. Our products contain more chlorine than the chlorostannic acid-rubber reaction products, and less chlorine than the saturated rubber hydrochlorides. Our products are less unsaturated than rubber hydrochloride of the same chlorine content, and are also free from amphoteric metal halides.

The process of our invention essentially comprises reacting solid rubber with hydrogen chloride at high temperatures and great speed. Our preferred method is to contact powdered rubber with gaseous hydrogen chloride under superatmospheric pressure. The resulting reaction is exothermic and extremely fast.

No attempt is made to cool the mass or otherwise regulate the temperature. The resulting temperature is so high that fusion takes place. The resulting product is hard and brittle, breaking with a conchoidal fracture. It is relatively insoluble in benzol and chlorinated solvents.

The exact mechanism of the reaction between powdered rubber and gaseous hydrogen chloride under superatmospheric pressure is not entirely understood. If powdered rubber and liquefied hydrogen chloride are reacted under controlled low temperature conditions a rubber hydrochloride is obtained. However, with powdered rubber and gaseous hydrogen chloride under superatmospheric pressure we have not been able to maintain the temperatures low enough to obtain rubber hydrochloride except possibly as an intermediate product. Furthermore when sheet rubber and hydrogen chloride gas are reacted at fusion temperatures the product is a soft partially saturated product and not the hard brittle resinous product obtained with powdered rubber. Heating of rubber hydrochloride likewise does not give our brittle, resinous product. It is, therefore, believed that high temperatures combined with high speed of reaction give our cyclic resinous halogen containing rubber derivative and that the use of powdered rubber and gaseous hydrogen chloride under superatmospheric pressure produces such conditions.

The following example will illustrate our invention: Powdered rubber sufficiently fine to pass a 30 mesh screen and consisting of substantially pure rubber free of amphoteric metal compounds was put in a pressure vessel and directly contacted with hydrogen chloride gas under 300 lbs. per sq. in. pressure. A temperature of 130° C. was observed but the actual temperature within the mass was probably much higher since the mass had fused and flowed together. Two runs were made, $D_1$ and $D_2$. The iodine number on $D_1$ was 100.9; on $D_2$—104.3. The chlorine content of $D_1$ was 5.6%, of $D_2$—4%. Assuming the originally powdered rubber was pure it is possible to calculate the percent of the original double bonds saturated with hydrogen chloride, the percent still remaining unsaturated as shown by the iodine number, and the percent which have been lost due to cyclization or polymerization. The figures are given below:

|  | $D_1$ | $D_2$ |
|---|---|---|
| Percent used by HCl | 16.5 | 11.8 |
| Percent showed by iodine No | 27.1 | 28.0 |
| Percent unsaturation lost | 56.4 | 60.2 |

The reaction products $D_1$ and $D_2$ were also treated with liquefied hydrogen chloride, a reagent which reacts extremely fast with rubber. The chlorine analysis before and after treatment was as follows:

|  | Before | After | Gain |
|---|---|---|---|
|  | Percent | Percent | Percent |
| $D_1$ | 5.6 | 7.8 | 2.2 |
| $D_2$ | 4.0 | 8.0 | 4.0 |

The reaction products $D_1$ and $D_2$ were compared with other halogen containing rubber derivatives.

The following table gives comparative chlorine contents and specific gravities:

Table I

|  | Percent chlorine | Sp. gr. |
|---|---|---|
| Chlorostannic acid rubber derivative (Pliolite) | 1.6 | 0.98–1.00 |
| Rubber hydrochloride obtained by reacting solid sheet rubber with hydrogen chloride at 100° C | 31.6 | 1.157 |
| $D_1$ | 5.6 | 1.000 |
| $D_2$ | 4.0 | 1.003 |

The following table gives the percent residue from a .5 gram of sample in 50 cc. of gasoline or benzol run at room temperature and at 60° C.

Table II

|  | Benzol | | Gasoline | |
|---|---|---|---|---|
|  | 20° C. | 60° C. | 20° C. | 60° C. |
| Chlorostannic acid rubber derivative (Philolite) | 0 | 0 | 0 | 0 |
| High temperature rubber hydrochloride | 100 | 97.4 | 100 | 100 |
| $D_1$ | 100 | 23.0 | 31.5 | 27.2 |
| $D_2$ | 25.2 | 8.4 | 11.4 | 10.8 |
| | 11.0 | | | |

The products of our invention are chlorine containing rubber derivatives of less unsaturation than rubber hydrochlorides of the same chlorine content, and of higher resistance to solvents than the reaction products of rubber and chlorostannic acid or rubber and stannic chloride. They are of resinous, brittle character and may be milled and molded into various articles of manufacture in a manner similar to other thermoplastic resins and plastics.

It is to be understood that various details may be varied without departing from the spirit of this invention. The rubber is preferably powdered or otherwise divided so as to give a large area of exposed surface. The powdered rubber may contain amphoteric metal compounds intimately admixed, but this is not essential. However, powdered rubber containing zinc stearate powder admixed has been found very satisfactory.

We claim:

1. The method of making a resin-like condensation derivative of rubber which comprises subjecting a mass of finely divided particles of rubber to hydrogen chloride under pressure of the order of 300 pounds per square inch to bring about an exothermic reaction, and allowing the reaction to proceed at such a speed and temperature as to fuse the mass of reacted particles.

2. The method of making a resin-like condensation derivative of rubber which comprises subjecting a mass of powdered rubber to gaseous hydrogen chloride under superatmospheric pressure to bring about an exothermic reaction, and allowing the reaction to proceed at such speed and temperature as to fuse the mass.

HERBERT A. WINKELMANN.
EUGENE W. MOFFETT.